J. MELLOR.
INSULATOR COVER.
APPLICATION FILED MAR. 23, 1916.
1,264,418.
Patented Apr. 30, 1918.
2 SHEETS—SHEET 2.
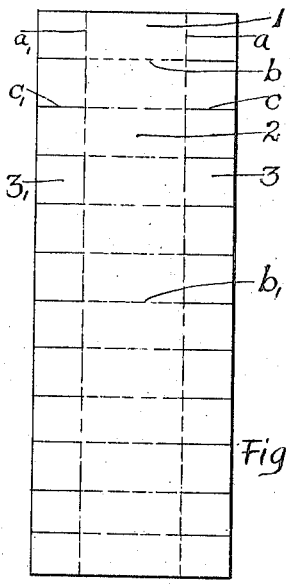
Fig 9
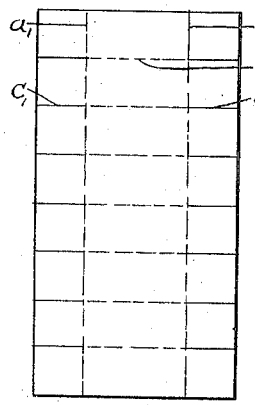
Fig 10
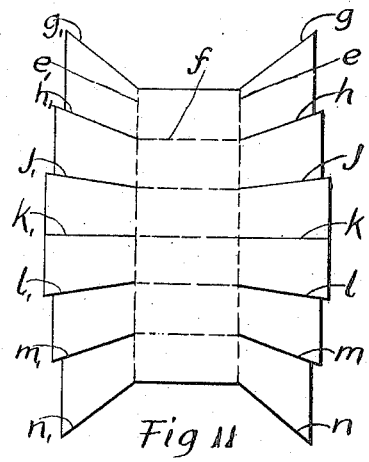
Fig 11
Fig 12 Fig 13
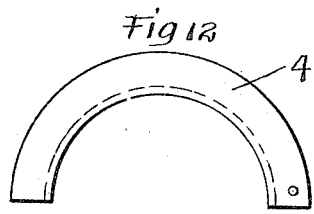
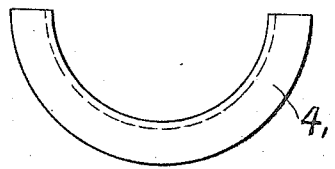
INVENTOR
John Mellor
BY
ATTORNEYS

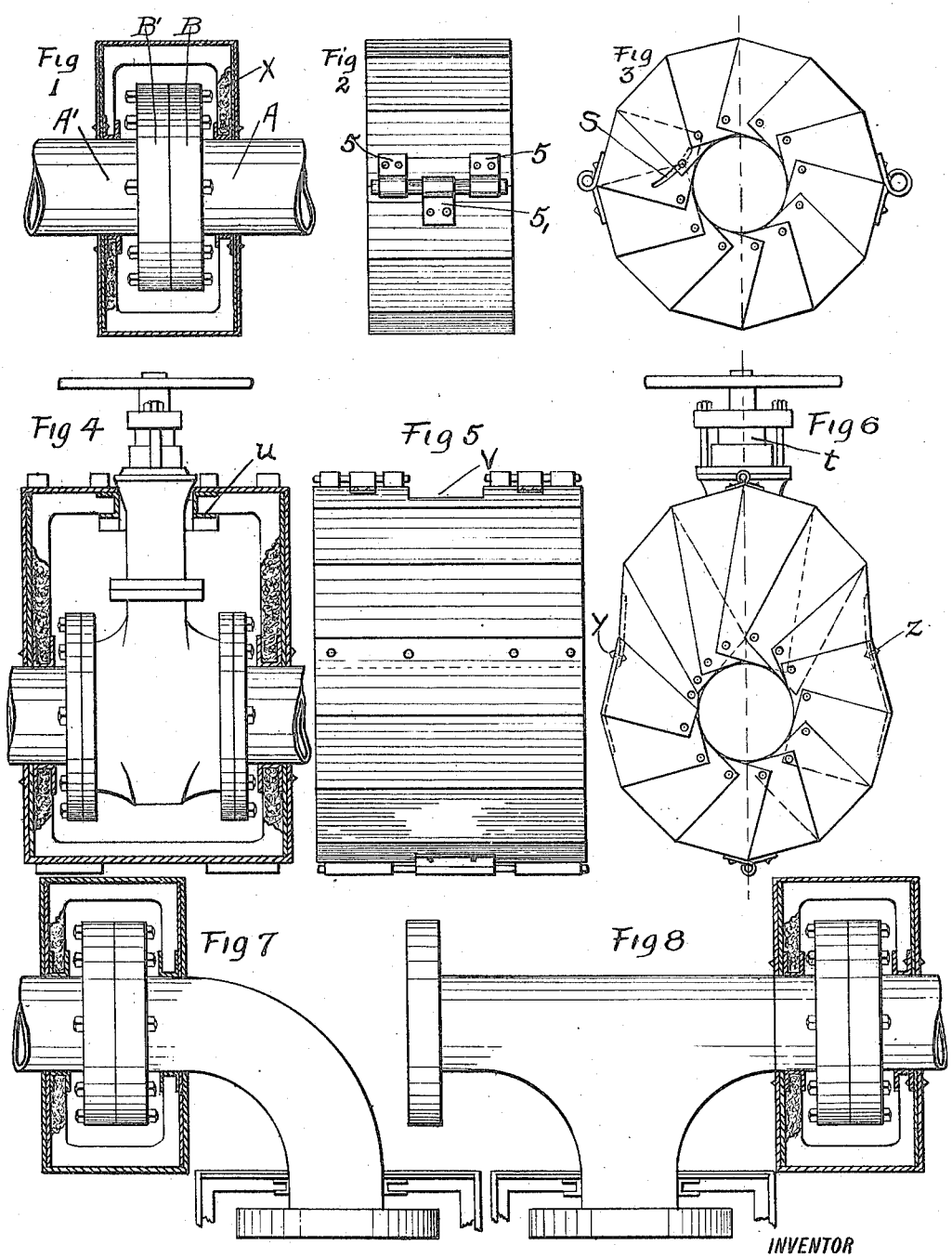

UNITED STATES PATENT OFFICE.

JOHN MELLOR, OF JERSEY CITY, NEW JERSEY.

INSULATOR-COVER.

1,264,418.	Specification of Letters Patent.	Patented Apr. 30, 1918.

Application filed March 23, 1916. Serial No. 86,107.

*To all whom it may concern:*

Be it known that I, JOHN MELLOR, a citizen of the United States, and residing in Jersey City, county of Hudson, and State of New Jersey, have invented new and useful Improvements in Insulator-Covers, of which the following is a specification.

This invention relates to insulator covers, the same being particularly adapted for inclosing and insulating valves and flanges of pipes in heating or refrigerating systems and has for its objects the production of a simple, durable, easily removable or repaired, yet effective and economical construction, which can be readily applied or removed, when desired, without requiring special tools and without disturbing the insulating layer or the piping, fittings or other extraneous parts. After removal it may be placed in its original shape without renewing any of the parts thereof. In constructions of this character, aside from the question of expense, there are many difficulties to be met with when it is desired to apply a ready-built covering to valves or flanges of various sizes irrespective of the position as regards adjacent walls, pillars or other obstructions. By my construction I am able to supply a ready-built construction which can be assembled in position on pipes of varying sizes, and which is capable of accommodating itself to valves of varying or irregular contour.

My invention is fully described and set forth in the accompanying specification and drawings forming a part thereof, in which—

Figure 1 is a front elevation of a steam conduit showing the two abutting flanges thereof, with my improved insulated cover shown in vertical section, applied thereto;

Fig. 2 shows a front elevation of the aforesaid insulator;

Fig. 3 is an end elevation of said insulator;

Fig. 4 is a view corresponding to Fig. 1 showing a steam conduit, having flanged valve with companion flanges for pipe connection, with my improved insulator shown in vertical section, applied thereto;

Fig. 5 is a front elevation of the insulator shown in Fig. 4;

Fig. 6 is an end elevation of the same insulator;

Figs. 7, and 8 show my improved insulator applied to an elbow and a T of a steam pipe respectively;

Fig. 9 is a plan view showing the blank from which the insulator shown in Figs. 1, 2, 3, 7 and 8 is constructed;

Figs. 10 and 11 are similar plan views showing blanks from which the upper and lower parts of the insulator shown in Figs. 4 and 5 and 6 are constructed; and Figs. 12 and 13 are end and front elevations respectively of the retaining ring which secures the overlapping leaves or blades of the insulator and supports the interior lining.

Referring to the drawings and the construction shown therein, the reference letters A and A' designate the pipe lines, such as a super-heated steam pipe provided with abutting flanges B, B'. As is well known it is usually the custom where economy in heating is desired, to properly cover not only such pipe themselves, but also the joints formed by the abutting flanges and particularly valve-bodies and bonnets.

My proposed casing is formed from a single strip of sheet metal 1 as indicated in Fig. 9 and the method of manufacturing the same therefrom is as follows:—

The sheet is preferably marked off along the lines $a$, $a'$ and $b$ to indicate lines of bending the same, and then slits are cut from the lateral margins inwardly along the lines $c$, $c'$ up to the indicator lines $a$, $a'$ respectively, thus forming the peripheral section 2 and the blade sections 3, 3'. The sheet when so cut is then bent, along the lines $a$, $a'$ and $b$, into the form shown in Figs. 2 and 3, each of the blades 3 being arranged so that it overlaps at one side an adjacent blade and on the opposite side is in turn preferably overlapped by another adjacent blade as shown in Fig. 3 and each of said free blades being riveted to an adjacent blade and in turn riveted to a U-shaped split ring having sections 4, 4' as hereinafter described. Preferably the sheets are cut transversely, such as along the line $b'$, into two halves, then these two halves after being shaped as shown in Figs. 2 and 3, are provided with hinge-leaves or straps, as indicated in Fig. 2 by the reference numeral 5, 5', so that by the insertion or withdrawal of a pintle 6 the two halves may be held together or separated as desired.

To construct my shell insulator it is merely necessary to ascertain in advance the size of a bare or covered pipe to which it is desired to apply the same, and then cut the strip so that the lower edge of the depending blades will form an approximate circle equal to the external perimeter of a bare or covered pipe, the edges being in reality each tangent to the circle to which it is desired to make the same conform, and the radius of the circle being equal to the radius of the external circumference of the pipe. Then a split ring as 4, 4' is riveted to the said depending blades in such manner that one rivet projects through an overlapping end of one blade, thence through the next overlapped end of an adjacent blade, and thence through the outer annular flange of one of said ring sections. A suitable arched lining of asbestos magnesia, baked fire clay or other insulating material, as indicated at X in Fig. 1, is then interposed on the inner face of said insulator, the same being held in position by the groove of said U-shaped split ring in which it is supported or incased. This arrangement provided a dead-air space around flanges B, B' that is in itself recognized as a highly efficient insulator, and thus eliminates the necessity of incurring the expense of filling the interior space, formed between the walls of insulating lining, with solid or loose insulating material, the use of which in practice is found to be highly unpractical as the space could not be properly filled except through a hand hole or opening and even then the material could not be readily removed through such an opening when desired.

In Figs. 4, 5 and 6 I have shown a modification wherein the casing is adapted to fit both the flanges of a steam pipe as well as the valve-bonnet thereof. Owing to the irregular configuration of the insulator, when so applied it is advisable to make the same from two sheets being approximately the shapes shown in Figs. 10 and 11, these being cut as follows:—

The rectangular strip shown in Fig. 10 is marked the same as the corresponding sheet shown in Fig. 9. It is then bent into the shape of the lower half of the casing shown in Fig. 6. Then the irregular shaped strip shown in Fig. 11 is marked with indicator lines $e, e'$ and $f$ and slits are cut along the lines $g\ g'$, $h\ h'$, $i\ i'$, $k\ k'$, $l\ l'$, $m\ m'$, $n\ n'$. Then this latter strip is bent to conform to the upper half of the casing as shown in Figs. 5 and 6, and a similar split ring is then secured to the blades adjacent their outer edges, the two sections of the casing being preferably riveted together as shown at $y$ and $z$ with the upper section preferably underlying the lower. In Figs. 7 and 8 I have illustrated different pipe-fittings to which my insulator may be applied as an elbow and a T respectively.

A particular advantage of this insulator is that it is very easy to change or distort the shape of the same so as to fit it around a valve and bonnet or abutting flanges, where there is comparatively little room to adjust any ready-built or shop-finished casing of regular shape having rigid halves. For convenience of adjustment, I may provide slots in the blades as indicated by S, in Fig. 3 which are adapted to receive the rivets when the insulator has been adjusted into position after one-half of the insulator has been distorted to the necessary extent to permit of its insertion between a bonnet or flange and an adjacent wall, pillar or other obstruction lying so close thereto as to preclude the fitting of a shop-finished rigid insulator around it.

Preferably the insulator is fitted to the bonnet so as to leave the stuffing-box gland, as indicated by the reference letter $t$, exposed, thus permitting of repacking or examination of the stuffing-box without removing the insulator. Moreover, the insulator itself can be applied to, or removed from, the bonnet without removal of the wheel or other part of the valve. As shown in Fig. 5 I preferably provide in such cases two sets of hinges or straps, positioned on each side of the bonnet so as to permit of its projection through an opening provided in the top of the insulator. A split ring $u$ (Fig. 4) corresponding to the split ring 4, 4', of any required shape, is also secured by rivets to the insulator adjacent the top opening V (Fig. 5) thereof and this also serves to support and retain the insulating lining.

Various minor modifications may be made without departing from the invention as herein claimed.

By the term "metallic sheet" as used in the claims, I include either sheet metal, perforated or not as may be desired, and also a wire mesh fabric, all of which may be shaped to receive, or have embedded therein, an insulating lining.

Among the advantages of my improved construction in addition to those already referred to, may be mentioned its extreme lightness due to the fact that the reinforcement of one blade by another permits of the use of much lighter material than would otherwise be possible. As a result not only is it possible to save on the cost of the material, but as the light material can be cut much more readily than heavier material, the whole structure can be cut with ordinary pocket cutting shears. As there are no curved edges or surfaces, not only is there little or no waste but the provision of a large variety of punches or tools for cutting the material along curved lines of large radius, is also unnecessary. The rivet holes alone require punching and this is obviously the simplest operation in sheet iron work.

Having thus described my invention, what

I claim and desire to secure by Letters Patent is:—

1. In an insulator cover for piping and the like, a continuous angular strip of material having a plurality of depending, integral overlapping lateral blades, each blade projecting in a plane substantially at a right angle to the plane of that portion of the strip with which it is integral, means for securing adjacent blades together, and means for reinforcing the free edges of said blades.

2. In an insulator cover for piping and the like, a continuous angular strip of material having a plurality of depending, integral overlapping lateral blades, each blade projecting in a plane substantially at a right angle to the plane of that portion of the strip with which it is integral, means for securing adjacent blades together, and heat-insulating solid material incased within said cover.

3. A polygonal insulator cover comprising a plurality of angular strips of metal secured together so as to from a continuous casing of polygonal contour, lateral terminal blades having straight edges formed integral with and projecting from each edge of each face of said polygon in a plane at an angle to the plane of such face and means for securing said blades together at their outer edges, and an insulator lining of solid material supported within said cover.

Signed at New York, county and State of New York, this 22nd day of March, 1916.

JOHN MELLOR.

Copies of this patent may be obtained for five cents each, by addressing the "Commissioner of Patents, Washington, D. C."